United States Patent [19]

Kashiwagi et al.

[11] Patent Number: 4,865,649

[45] Date of Patent: Sep. 12, 1989

[54] COATING SOLUTION FOR FORMING A SILICA-BASED COATING FILM

[75] Inventors: Eiichi Kashiwagi, Kawasaki; Muneo Nakayama, Tokyo; Akira Hashimoto, Yokohama; Toshihiro Nishimura, Kawasaki, all of Japan

[73] Assignee: Tokyo Ohka Kogyo Co., Ltd., Kanagawa, Japan

[21] Appl. No.: 277,497

[22] Filed: Nov. 30, 1988

Related U.S. Application Data

[63] Continuation of Ser. No. 120,353, Nov. 13, 1987, abandoned.

[30] Foreign Application Priority Data

Nov. 18, 1986 [JP] Japan ............................ 61-273018

[51] Int. Cl.$^4$ .............................................. C09K 3/00
[52] U.S. Cl. .............................................. 106/287.16
[58] Field of Search ...................... 106/287.16, 287.12

[56] References Cited

U.S. PATENT DOCUMENTS

| | | | |
|---|---|---|---|
| 2,450,327 | 9/1948 | Cogan | 106/287.16 |
| 2,618,570 | 11/1952 | Blackburn | 106/287.16 |
| 2,699,410 | 1/1955 | Emblem | 106/287.16 |
| 4,605,446 | 8/1986 | Isozaki | 106/287.16 |

Primary Examiner—Theodore Morris
Attorney, Agent, or Firm—Wyatt, Gerber, Burke and Badie

[57] ABSTRACT

The coating solution of the invention is useful for forming a silica-based coating layer on a substrate such as semiconductor silicon wafers in the manufacturing process of semiconductor devices such as VLSIs. The coating solution is particularly advantageous to smooth a substrate surface having a difference in levels by completely filling the recessed areas. The coating solution is an organic solution of a cohydrolyzate of an alkoxy silane mixture composed of at least two kinds of di-, tri- and tetraalkoxy silane compounds such as a combination of methyl trimethoxy silane and tetramethoxy silane in a specified molar ratio and can be prepared by adding water to an organic solution of these alkoxy silane compounds without using any acid catalyst to effect the cohydrolysis of the silane compounds.

8 Claims, No Drawings

COATING SOLUTION FOR FORMING A SILICA-BASED COATING FILM

This application is a continuation of Ser. No. 07/120,353 filed 11/13/87 now abandoned.

BACKGROUND OF THE INVENTION

The present invention relates to a coating solution used for forming a silica-based coating film on various substrate surfaces of semiconductor, glass, metal, ceramic and the like.

It is a prominent trend in recent years along with the rapid progress in the manufacturing technology of semiconductor devices or, in particular, VLSIs that the demand for technology upgrading is increasing in multilayer wiring processes in order to obtain devices of high degree of integration, high operating velocity and multiplicity of performance.

As is known, the manufacturing process of VLSIs involves forming of wiring patterns and insulating layers on the substrate surface and it is usually unavoidable that a difference in levels is produced on the surface by such a treatment. When a wiring pattern is formed on such a surface having a level difference, it is natural that the accuracy of the wiring pattern can no longer be high enough thereby disadvantageously limiting the fineness of wiring. Accordingly, such a surface of substrate having a level difference must be subjected to a smoothing treatment prior to the subsequent patterning treatment.

In the prior art, the smoothing treatment above mentioned is performed by coating the substrate surface with a coating solution prepared by dissolving a silanol compound in an organic solvent, which is mainly an alcohol, to fill the recessed areas on the substrate surface having a level difference and further to overcoat the whole surface followed by a heat treatment or baking treatment so that a silica-based coating layer for smoothing is formed by the silanol condensation of the silanol compound. Such a method is usually called a spin-on-glass (SOG) coating method and widely practiced in the semiconductor technology. This method is truly very reliable because the smoothing coating layer thus formed is completely inorganic. On the other hand, the silica-based coating layer unavoidably has some brittleness so that cracks are sometimes formed in the coating layer, especially, when the coating layer has a thickness sufficiently large to completely fill the recessed areas and smooth the substrate surface having a level difference. Therefore, it is sometimes practiced that the spin-on-glass coating method is combined with a chemical vapor deposition method so as to form the smoothing coating layer in two different ways successively.

Several proposals have been made to develop an improved coating solution useful in the spin-on-glass coating method from which a coating layer of a relatively large thickness can be obtained without the danger of crack formation including an organic solution of a ladder polymer-type silicone. Coating solutions of this type, however, have problems from the standpoint of practical applications because the coating layer obtained therefrom has a relatively low heat resistance and decomposes at a temperature of 300° to 400° C. in addition to the poor moisture resistance.

Besides, the so-called biased sputtering method is sometimes undertaken to effect smoothing of the substrate surface having a level difference in minute areas, in which the substrate surface is lightly bombarded with charged particles so as not to leave any residual gas such as hydrogen, oxygen, nitrogen and the like in the substrate during formation of a coating layer. This method, however, is defective because the substrate surface is more or less damaged in the course of deposition of the coating layer.

SUMMARY OF THE INVENTION

The present invention accordingly has an object to provide a novel and improved coating solution used in the spin-on-glass coating method capable of giving a silica-based coating layer having a relatively large thickness without any drawbacks and having high heat resistance and moisture resistance to solve the above described problems in the conventional coating solutions.

Thus, the present invention provides a coating solution for forming a silica-based coating layer which comprises:

(A) an organic solvent; and (B) a cohydrolyzate of a mixture of alkoxy silane compounds composed of a tetraalkoxy silane compound represented by the general formula $Si(OR)_4$ and at least one of dialkoxy silane compounds represented by the general formula $R^1{}_2Si(OR)_2$ and trialkoxy silane compounds represented by the general formula $R^1Si(OR)_3$, in which each $R^1$ is, independently from the others, an alkyl group having 1 to 3 carbon atoms or a phenyl group and each R is, independently from the others, an alkyl group having 1 to 3 carbon atoms, in such a proportion that the average number of the alkoxy groups per silicon atom in the mixture is in the range from 3.00 to 3.85, dissolved in the organic solvent.

DETAILED DESCRIPTION OF THE PREFERRED EMBODIMENTS

As is described above, the coatrng solution of the present invention is an organic solution of a cohydrolyzate of a mixture of alkoxy silanes composed of a tetraalkoxy silane and at least one of di- and trialkoxy silanes in a specified proportion. Such a coating solution can be readily prepared by dissolving the alkoxy silane compounds in a suitable proportion in an organic solvent and then admixing the organic solution with a controlled amount of water to effect cohydrolysis of the alkoxy silane compounds.

It is essential in the preparation of the inventive coating solution that at least one kind of di- and trialkoxy silane compounds is combined with a tetraalkoxy silane compound and cohydrolyzed together in an organic solvent. The dialkoxy silane compound, represented by the general formula $R^1{}_2Si(OR)_2$, R being a methyl, ethyl, propyl or phenyl group and R being a methyl, ethyl or propyl group, is exemplified by dimethyl dimethoxy silane, dimethyl diethoxy silane, dimethyl dipropoxy silane, diethyl dimethoxy silane, diethyl diethoxy silane, diethyl dipropoxy silane, dipropyl dimethoxy silane, dipropyl diethoxy silane, dripropyl dipropoxy silane, diphenyl dimethoxy silane, diphenyl diethoxy silane and diphenyl dipropoxy silane. The trialkoxy silane compound, represented by the general formula $R^1Si(OR)_3$, $R^1$ and R each having the same meaning as defined above, is exemplified by methyl trimethoxy silane, methyl triethoxy silane, methyl tripropoxy silane, ethyl trimethoxy silane, ethyl triethoxy silane, ethyl tripropoxy silane, propyl trimethoxy silane, propyl triethoxy silane, propyl tripropoxy silane, phenyl trimethoxy silane, phenyl triethoxy silane and phenyl tripropoxy silane. The tetraalkoxy silane compound, represented by the general formula Si(OR)$_4$, R having the same meaning as defined above, is exemplified by tetramethoxy silane, tetraethoxy silane and tetrapropoxy silane.

In the preparation of the inventive coating solution, two or more of the alkoxy silane compounds should be combined in such proportion that the average number of the alkoxy groups per silicon atom in the alkoxy silane mixture, which proportion is referred to as the average functionality hereinbelow, should be in the range from 3.00 to 3.85 or, preferably, from 3.33 to 3.83 or, more preferably, from 3.50 to 3.75. When the average functionality of the alkoxy silane mixture is too large, the coating solution prepared from such an alkoxy silane mixture can hardly give a coating layer having a sufficiently large thickness by a single coating in addition to the appearance of brittleness in the coating layer eventually to cause crack formation. When the average functionality of the alkoxy silane mixture is too small, on the other hand, the coating layer obtained from the coating solution may have somewhat decreased heat and moisture resistance.

Preferable combinations, accordingly, should comprise at least one tetraalkoxy silane compound combined with a dialkoxy silane compound and/or a trialkoxy silane compound from the standpoint of practical applicability. It should be noted here that a coating solution prepared from a tetraalkoxy silane alone is not desirable because the coating solution has a relatively low viscosity so that a single coating of the substrate surface therewith can provide a coating layer having a thickness of only 0.4 $\mu$m or smaller and a coating layer having a sufficient thickness can be obtained only by repeating application of the solution to the substrate surface each time followed by drying if not to mention the brittleness of the coating layer having a sufficient thickness susceptible to crack formation and the poor adhesion of the coating layer to the substrate surface. When a tetraalkoxy silane is cohydrolyzed together with a dialkoxy silane compound and/or a trialkoxy silane compound, on the other hand, the cohydrolyzate of the silane mixture may have silicon-bonded organic groups even after complete cohydrolysis so that the resultant solution may have an adequately increased viscosity. Accordingly, a coating layer having a thickness of 1 $\mu$m or larger can easily be obtained by a single coating with the thus prepared coating solution. Moreover, the silica-based coating layer obtained by using the inventive coating solution is less brittle and more resistant against crack formation in addition to the increased adhesion of the coating layer to the substrate surface than the coating layer formed from a coating solution containing a hydrolyzate of a tetraalkoxy silane compound alone so that the object of the invention to smooth the substrate surface can readily be achieved. In this regard, the alkoxy silane mixture to be cohydrolyzed should contain preferably at least 25% by weight of one or more of the tetraalkoxy silane compounds.

A preferable formulation of the inventive coating solution relative to the mixing ratio of the alkoxy silane compounds is that a mole of the trialkoxy silane compound, e.g., methyl trimethoxy silane, is combined with 0.5 to 5 moles or, preferably, 1 to 3 moles of the tetraalkoxy silane compound, e.g., tetramethoxy silane, optionally, together with up to 2 moles of a dialkoxy silane compound, e.g., dimethyl dimethoxy silane. Alternatively, a mole of the tetraalkoxy silane compound is combined with 0.2 to 2 moles of a dialkoxy silane compound. When the molar proportion of the tetraalkoxy silane compound is smaller than the above mentioned range, a sufficiently thick coating layer cannot be obtained by a single coating with the coating solution. When the molar proportion of the tetraalkoxy silane compound is too large, on the other hand, cracks are sometimes formed in the coating layer formed from the coating solution. Generally speaking, increase in the molar proportion of the dialkoxy silane compound and/or trialkoxy silane compound has an effect to decrease the heat resistance and moisture resistance of the coating layer formed from the coating solution so that the practical value of the coating solution is somewhat decreased. A particularly preferable alkoxy silane mixture subjected to the cohydrolysis reaction is composed of a mole of methyl trimethoxy silane and 1 to 3 moles of tetramethoxy silane.

The coating solution of the invention is prepared by cohydrolyzing the above mentioned alkoxy silane mixture in an organic solvent. Preferable organic solvents suitable as the medium for the cohydrolysis reaction of the alkoxy silane mixture include monohydric alcohols such as methyl, ethyl, propyl and butyl alcohols, polyhydric alcohols such as ethylene glycol, diethylene glycol and propylene glycol, monoethers of polyhydric alcohols such as ethylene glycol monomethyl ether, ethylene glycol monoethyl ether, ethylene glycol monopropyl ether, ethylene glycol monobutyl ether, propylene glycol monomethyl ether, propylene glycol monoethyl ether and propylene glycol monopropyl ether, and carboxylic acids such as acetic and propionic acids. These organic solvents can be used either singly or as a mixture of two kinds or more according to need. The organic solvent as the medium for the cohydrolysis reaction should preferably be selected from the above mentioned monohydric alcohols, polyhydric alcohols and ethers of polyhydric alcohols. These organic solvents are used usually in an amount from 50 to 100 parts by weight per 100 parts by weight of the alkoxy silane mixture.

Although it is well known that each of the above named di-, tri- and tetraalkoxy silane compounds can be readily hydrolyzed alone, it is essential in the preparation of the inventive coating solution that two kinds or more of these alkoxy silane compounds including a tetraalkoxy silane are combined and cohydrolyzed in the organic solvent by adding water. When two or more of organic solutions each containing a hydrolyzate of a different alkoxy silane compound from the others are mixed together, no clear silica-based coating layer can be formed by coating with such a solution. Namely, the coating layer is sometimes cloudy and cannot be completely even over the whole surface.

It is further important that the cohydrolysis of the alkoxy silane mixture by adding water to the organic solution should be performed in the absence of any catalyst known to have a promoting activity on the hydrolysis reaction. Thus, the cohydrolysis reaction is performed by adding water to the organic solution of the alkoxy silane mixture in an amount of 2 to 5 moles per mole of the alkoxy groups in the alkoxy silane mixture and then agitating the solution at room temperature. The cohydrolysis reaction is complete usually within 20 to 150 hours. It is preferable that the solution after the cohydrolysis reaction is used as the inventive coating solution after aging of at least 2 days at room temperature. It is optional that the reaction is accelerated by adding water dropwise into the solution of the alkoxy silane mixture heated at a temperature not exceeding 80° C. The thus prepared solution after completion of the cohydrolysis reaction and aging can be used as such as the desired coating solution at room temperature optional that the solution is diluted by adding a suitable diluent solvent to have an appropriate concentration relative to the solid content which is approximately equal to the concentration calculated as $SiO_2$. The diluent solvent is selected from ketones such as acetone, methyl ethyl ketone, acetyl acetone and methyl isobutyl ketone and esters such as methyl acetate, ethyl acetate and butyl acetate in addition to the organic solvents used as the medium for the cohydrolysis reaction described above. These diluent solvents can be used either singly or as a combination of two kinds or more according to need.

The coating solution of the invention is applicable to various kinds of substrates such as semiconductor silicon wafers, glass plates, metal plates, ceramic plates and the like by any known coating method including the spinner method, roller coater method, dipping-and-pulling-up method, spray method, screen printing method, brushing method and the like. The substrate coated with the inventive coating solution is dried and then subjected to a heat treatment at a temperature of 250° to 500° C. so as to form a smooth and uniform silica-based coating layer having excellent heat and moisture resistance.

As is understood from the above given description, the coating solution of the invention can be used advantageously to form a silica-based coating layer having a thickness of 1 μm or larger by a single coating with good stability. In addition to the above mentioned heat and moisture resistance, the coating layer formed from the inventive coating solution exhibits good adhesion to the underlying layer formed by the chemical vapor-phase deposition and aluminum-made wiring pattern so that the coating solution can be used in various steps of the manufacturing process of VLSIs not only as a levelling agent of the substrate surface having a level difference but also as an intermediate masking agent in the multi-layer photoresist method, an agent for forming a photoextinctive and masking layer in the dry etching of an aluminum layer and so on.

In the following, the coating solution of the invention is described in more detail by way of examples.

EXAMPLE 1

A solution of alkoxy silane compounds was prepared by adding 136 g (1 mole) of methyl trimethoxy silane and 152 g (1 mole) of tetramethoxy silane to 220 g of ethylene glycol mono-n-butyl ether and then 108 g (6 moles) of pure water were gradually added thereto dropwise under agitation followed by further continued agitation for about 6 hours. The thus prepared solution was kept standing at room temperature before it is used as a coating solution. The concentration of the solid matter in this solution was about 20% by weight, which was approximately equal to the concentration calculated as $SiO_2$, as determined by evaporation to dryness.

A 4-inch silicon wafer was coated with the thus prepared coating solution on a spinner rotating at 2000 rpm for 60 seconds followed by drying and a heat treatment at 450° C. for 30 minutes so that a uniform coating layer having a thickness of 1.0 μm was formed on the substrate surface. The coating layer was free from cracks and pin holes.

EXAMPLE 2

A uniform silica-based coating layer having a thickness of 1.0 μm and free from cracks and pin holes was formed on a silicon wafer in substantially the same manner as in Example 1 except that the coating solution containing 20% by weight of the solid matter was prepared by adding 198 g (11 moles) of water to a solution of 136 g (1 mole of methyl trimethoxy silane and 304 g (2 moles) of tetramethoxy silane in 278 g of propylene glycol mono-n-propyl ether and the solution was aged for 5 days at room temperature before use following about 6 hours of agitation.

EXAMPLE 3

A uniform silica-based coating layer having a thickness of 1.1 μm and free from cracks and pin holes was formed on a silicon wafer in substantially the same manner as in Example 2 except that the coating solution containing 20% by weight of the solid matter was prepared by adding 270 g (15 moles) of water to a solution of 136 g (1 mole) of methyl trimethoxy silane and 456 g (3 moles) of tetramethoxy silane in 354 g of n-butyl alcohol.

EXAMPLE 4

A 4-inch silicon wafer was provided on the surface with a coating film of $SiO_2$ having a thickness of 0.7 μm by the vapor-phase deposition method and the $SiO_2$ film was patterned by the photolithographic method in a usual way so that a level difference of 0.7 μm was formed on the substrate surface.

The substrate surface was then coated with the coating solution prepared in Example 1 on a spinner rotating at 4000 rpm for 60 seconds to find that the recessed areas on the surface were completely filled with the coating layer to form a smooth surface. The silica-based coating layer obtained by a heat treatment at 450° C. for 30 minutes was free from cracks and pin holes.

EXAMPLE 5

A solution of alkoxy silane compounds was prepared by adding 120 g (1 mole) of dimethyl dimethoxy silane, 136 g (1 mole) of methyl trimethoxy silane and 152 g (1 mole) of tetramethoxy silane to 300 g of butyl alcohol and then 162 g (9 moles) of pure water were gradually added to the solution dropwise under agitation followed by further continued agitation for about 5 hours. After standing for 5 days at room temperature, the solution was diluted by adding butyl alcohol so that the concentration of the solid matter in the solution was adjusted to 15% by weight.

A 4-inch silicon wafer was coated with the thus prepared coating solution on a spinner rotating at 2000 rpm for 30 seconds and then subjected to a heat treatment at 430° C. for 60 minutes so that a uniform silica-based coating layer having a thickness of 1.0 μm was formed on the surface. The coating layer was free from cracks and pin holes.

EXAMPLE 6

A solution of alkoxy silane compounds was prepared by adding 74 g (0.5 mole) of dimethyl diethoxy silane, 198 g (1 mole) of phenyl trimethoxy silane and 264 g (1 mole) of tetrapropoxy silane to 500 g of propylene glycol monomethyl ether and then 180 g (10 moles) of pure water were gradually added dropwise to the solution kept at 60° C. under agitation followed by further continued agitation for about 6 hours. After standing for 4 days at room temperature, the solution was diluted by adding propyl alcohol so that the concentration of the solid matter in the solution was adjusted to 10% by weight.

A glass plate as a substrate was coated with the thus prepared coating solution by dipping in and pulling up from the solution at a pulling-up velocity of 30 cm/minute followed by a heat treatment at 450° C. for 60 minutes so that a uniform silica-based coating film having a thickness of 1.5 μm was formed on the surface. The coating layer was free from cracks and pin holes.

EXAMPLE 7

A solution of alkoxy silane compounds was prepared by adding 150 g (1 mole) of ethyl trimethoxy silane and 416 g (2 moles) of tetraethoxy silane to 500 g of propyl alcohol and then 162 g (9 moles) of pure water were gradually added thereto dropwise followed by further continued agitation for about 6 hours. After standing for 5 days at room temperature, the solution was diluted by adding ethylene glycol monomethyl ether so that the concentration of the solid matter in the solution was adjusted to 17% by weight.

A 4-inch silicon wafer was coated with the thus prepared coating solution on a spinner rotating at 2000 rpm for 30 seconds followed by a heat treatment at 400° C. for 30 minutes so that a uniform coating layer having a thickness of 1.2 μm was formed on the surface. The coating layer was free from cracks and pin holes.

EXAMPLE 8

A solution of alkoxy silane compounds was prepared by adding 178 g (1 mole) of methyl triethoxy silane and 456 g (3 moles) of tetramethoxy silane to 400 g of ethylene glycol monomethyl ether and then 216 g (12 moles) of pure water were gradually added dropwise to the solution kept at 60° C. under agitation followed by further continued agitation for about 5 hours. After standing for 5 days at room temperature, the solution was diluted by adding methyl alcohol so that the concentration of the solid matter in the solution was adjusted to 10% by weight.

A glass plate was coated with the thus prepared coating solution and subjected to a heat treatment in the same manner as in Example 6 so that a uniform silica-based coating layer having a thickness of 1.0 μm was formed on the glass surface. The coating layer was free from cracks and pin holes.

EXAMPLE 9

With an object to examine the heat resistance of the coating layers formed from the coating solutions prepared in Examples 1 to 3 and 5 to 8, each of the coating solutions was evaporated to dryness by heating at 150° C. for 20 minutes and the thus obtained solid material was examined by the thermogravimetric analysis at a rate of temperature elevation of 5° C./minute. The results were that absolutely no weight decrease was noted in the weight vs. temperature diagram for each solid material in the temperature range up to 550° C. indicating that the silica-based coating layer obtained from the inventive coating solution had excellent heat resistance.

COMPARATIVE EXAMPLE 1

Into an alkoxy silane solution prepared by dissolving 272 g (2 moles) of methyl triethoxy silane in 200 g of ethylene glycol mono-n-butyl ether were added gradually 108 g (6 moles) of water dropwise under agitation and the mixture was agitated at room temperature for about 6 hours. The thus obtained solution contained 20% by weight of the solid matter calculated as $SiO_2$. A silicon wafer was coated with the thus obtained coating solution after standing for 5 days at room temperature in substantially the same manner as in Example 1. The results were that the silica-based coating film formed on the substrate surface had a thickness of 0.5 μm but the surface condition was clearly less uniform and less smooth than in Example 1. The heat resistance of the coating film was examined in the same manner as in Example 9 to find that the coating film in this case was clearly less heat-resistant than in Example 1.

COMPARATIVE EXAMPLE 2

The experimental procedure was substantially the same as in Comparative Example 1 except that the coating solution was prepared from a solution of 304 g (2 moles) of tetramethoxy silane in 300 g of ethylene glycol mono-n-butyl ether to which 144 g (8 moles) of water were added. The coating film formed on a silicon wafer by using this coating solution had a thickness of 0.4 μm but a considerable number of cracks were found in the coating layer.

What is claimed is:

1. A coating solution for forming a silica based coating layer which consisting essentially of
   (A) an organic solvent, and
   (B) a cohydrolyzate of a mixture of methyl trimethoxy silane and tetramethyoxy silane, said cohydrolyzate having been formed in water in the absence of a catalyst to promote the hydrolysis reaction from a mixture of methyl trimethoxy silane and tetramethoxy silane in a molar ratio of 1:0.5 to 1:5.

2. The coating solution as claimed in claim 1 wherein the component (B) is a cohydrolyzate of methyl trimethoxy silane and tetramethoxy silane in a molar ratio in the range from 1:1 to 1:3.

3. The coating solution as claimed in claim 1 wherein the organic solvent as the component (A) is selected from the group consisting of monohydric alcohols, polyhydric alcohols, monoethers of a polyhydric alcohol and carboxylic acids.

4. A coating solution for forming a silica based coating layer which is a solution of a cohydrolyzate of methyl trimethoxy silane and tetramethoxy silane in an organic solvent prepared by the steps of:
   (A) dissolving a mixture of methyl trimethoxy silane and tetramethoxy silane in a molar ratio of from 1:0.5 to 1:5 in an organic solvent, and
   (B) adding water which is free of any hydrolysis reaction promoting catalyst to the solution to effect cohydrolysis of the methoxy silane compounds.

5. The coating solution as claimed in claim 4 wherein the amount of the organic solvent is in the range from 50 to 100 parts by weight per 100 parts by weight of the methoxy silane compounds.

6. The coating solution as claimed in claim 4 wherein the amount of water added to the methoxy silane solution in step (b) is in the range from 0.5 to 2.0 moles per mole of the alkoxy groups in the methoxy silane compounds.

7. The coating solution as claimed in claim 4 wherein water is added to the methoxy silane solution in step (b) at a temperature in the range from room temperature to 80° C.

8. The coating solution as claimed in claim 4 wherein the methoxy silane solution to which water is added in step (b) contains no catalyst for the hydrolysis of the methoxy silane compounds.

* * * * *